United States Patent
Lewis (10) Patent No.: US 10,674,423 B2
(45) Date of Patent: Jun. 2, 2020

(54) AUTOMATIC CONFIGURATION OF A DIGITAL DAS FOR SIGNAL DOMINANCE

(71) Applicant: Maven Wireless Sweden AB, Kista (SE)

(72) Inventor: Michael Lewis, Märsta (SE)

(73) Assignee: Maven Wireless Sweden AB, Kista (SE)

(*) Notice: Subject to any disclaimer, the term of this patent is extended or adjusted under 35 U.S.C. 154(b) by 0 days.

(21) Appl. No.: 16/488,069

(22) PCT Filed: Feb. 22, 2018

(86) PCT No.: PCT/EP2018/054409
§ 371 (c)(1),
(2) Date: Aug. 22, 2019

(87) PCT Pub. No.: WO2018/153998
PCT Pub. Date: Aug. 30, 2018

(65) Prior Publication Data
US 2020/0068474 A1 Feb. 27, 2020

(30) Foreign Application Priority Data
Feb. 23, 2017 (SE) .................................. 1750194

(51) Int. Cl.
*H04W 40/12* (2009.01)
*H04B 17/318* (2015.01)
(Continued)

(52) U.S. Cl.
CPC ............. *H04W 40/12* (2013.01); *H04B 7/04* (2013.01); *H04B 17/318* (2015.01);
(Continued)

(58) Field of Classification Search
None
See application file for complete search history.

(56) References Cited

U.S. PATENT DOCUMENTS

| | | |
|---|---|---|
| 2010/0020685 A1 | 1/2010 | Short et al. |
| 2013/0071112 A1 | 3/2013 | Melester et al. |
| | (Continued) | |

FOREIGN PATENT DOCUMENTS

| | | |
|---|---|---|
| WO | 9729608 A1 | 8/1997 |
| WO | 9800996 A1 | 1/1998 |
| | (Continued) | |

OTHER PUBLICATIONS

International Search Report and Written Opinion for International Application No. PCT/EP2018/054409, dated Jun. 18, 2018, 11 pages.
(Continued)

*Primary Examiner* — Huy D Vu
*Assistant Examiner* — Hong Shao
(74) *Attorney, Agent, or Firm* — RatnerPrestia (57) ABSTRACT

A digital distributed antenna system ("DAS") configured to route at least one reference signal received by at least one digital master unit to at least one digital remote unit. The DAS has at least one processing unit configured to cause the DAS to measure a strength of a received reference signal, determine a required strength that the received reference signal should have upon being transmitted to a wireless communication device located in a coverage area served by the at least one digital remote unit, and adjust a gain of a routing path of the DAS via which the received reference signal is to be routed to an antenna port of the at least one digital remote unit such that the strength of the received reference signal attains the required strength when being transmitted from said at least one digital remote unit.

11 Claims, 7 Drawing Sheets

(51) Int. Cl.
*H04B 7/04* (2017.01)
*H04W 40/06* (2009.01)
*H04L 5/00* (2006.01)
*H04L 12/24* (2006.01)

(52) U.S. Cl.
CPC ........ *H04L 5/0048* (2013.01); *H04L 41/0806* (2013.01); *H04W 40/06* (2013.01)

(56) References Cited

U.S. PATENT DOCUMENTS

| | | |
|---|---|---|
| 2015/0098372 A1 | 4/2015 | Zavadsky et al. |
| 2016/0127101 A1 | 5/2016 | Hanson et al. |
| 2017/0085405 A1 | 3/2017 | Xu et al. |
| 2018/0124729 A1 | 5/2018 | Hanson |

FOREIGN PATENT DOCUMENTS

| | | |
|---|---|---|
| WO | 2015116451 A1 | 8/2015 |
| WO | 2016046829 A2 | 3/2016 |

OTHER PUBLICATIONS

International Preliminary Report on Patentability for International Application No. PCT/EP2018/054409, dated Feb. 20, 2019, 7 pages.
Swedish Office Action for Swedish Application No. 1750194-1, dated Jul. 18, 2017, 8 pages.
Non Final Office Action for U.S. Appl. No. 16/488,075, dated Feb. 20, 2020, 20 pages.

AUTOMATIC CONFIGURATION OF A DIGITAL DAS FOR SIGNAL DOMINANCE

This application is a U.S. National Phase application of PCT International Application No. PCT/EP2018/054409, filed Feb. 22, 2018, which claims the benefit of Swedish Application SE 1750194-1, filed Feb. 23, 2017, both of which are incorporated by reference herein.

TECHNICAL FIELD

The invention relates to a distributed antenna system (DAS), and a method performed by the DAS of routing at least one reference signal received by at least one digital master unit of the DAS to at least one digital remote unit of the DAS.

BACKGROUND

A distributed antenna system (DAS) is a technology for providing radio coverage in an area which cannot be directly served from the general mobile radio network (for example, tunnels in a metro system, or a building complex), and is particularly advantageous in applications where multiple wireless service providers need to provide coverage since a single DAS can be used with many radio base stations.

Figure 1:
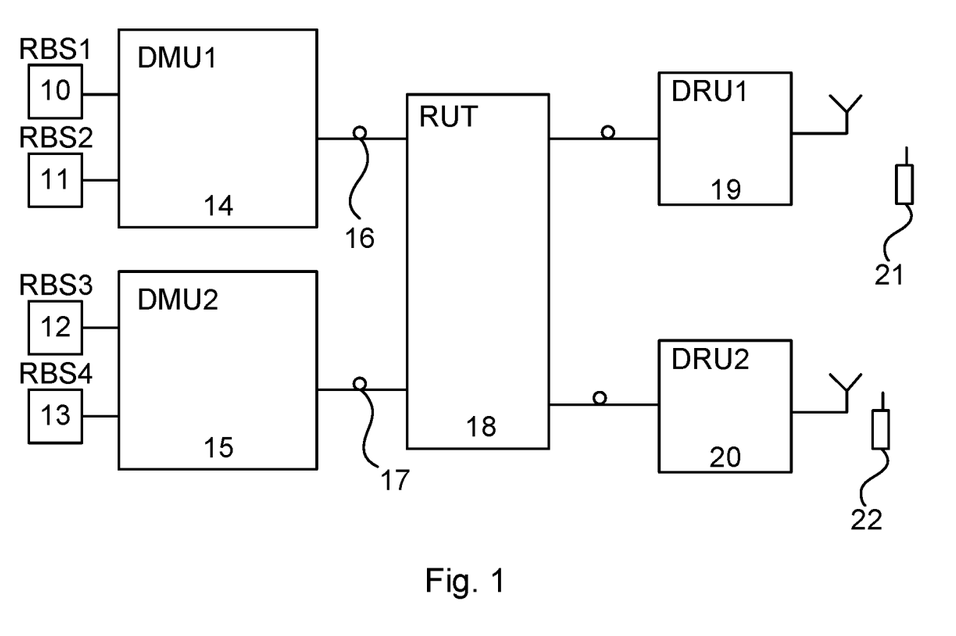
FIG. 1 illustrates a typical digital DAS.

A typical digital DAS is shown in FIG. 1 and consists of head-end equipment, herein referred to as digital master units (DMUs) 14, 15, which receive downlink signals from a number of radio base stations (RBSs) 10-13, and convert them for transport on optical fibers 16, 17 via one or more routing units (RUs) 18 to a number of remote nodes 19, 20, herein referred to as digital remote units (DRUs), located in the coverage area which convert the optical signals into radio signals which can be broadcast on antennas driven by the DRUs 19, 20 for transport to/from wireless communication devices (WCDs) 21, 22 such as smart phones and tablets. Each DRU 19, 20 receives uplink signals from its connected antenna(s) and converts them for transmission over the optical fibers 16, 17 back to the DMUs 14, 15 and onward to the RBSs 10-13.

A modern active DAS, as that illustrated in FIG. 1, transports the radio signals in the form of digital samples, usually over fiber optic connections though not always. Digital data transport allows for flexible routing and distribution of radio signals with a much finer degree of control over which signals go to which DRU.

Base station signals are converted into filtered streams of digital data corresponding to the different carrier frequency allocations, and uplink signals are likewise filtered according to the frequency allocations and sent back to the base stations. The base station interface can be analogue (for instance, with radio frequency (RF) downlink and uplink signals) or digital (where the downlink and uplink signals are encoded in digital form).

When the DAS is correctly configured, it appears as a transparent "pipe" through which the signals are transferred in the downlink and uplink directions with an appropriate gain in each direction set by the system installer.

A significant part of the cost of a DAS installation comes from the number of man-hours required to set up and commission the DAS. For a digital DAS, the main tasks are to define the carrier frequency ranges used by the base stations (so that digital filter center frequencies and bandwidths of the DAS are set appropriately) and to set the correct gain parameters so that the required signal level is achieved in each of the coverage areas. In the event of frequency re-farming by the mobile network operator, where the allocation of frequency ranges to particular technologies is changed—for example when replacing a legacy Global System for Mobile Communications (GSM) system with a Long Term Evolution (LTE) system—this manual work needs to be repeated and further; during this time the DAS will likely not provide any radio coverage.

US 2013/071112 discloses a configuration sub-system for telecommunication systems. The configuration sub-system can include a test signal generator, a power measurement device, at least one additional power measurement device, and a controller. The test signal generator can be integrated into components of a telecommunication system. The test signal generator can provide a test signal to a signal path of the telecommunication system. The power measurement device and the additional power measurement device can respectively be integrated into different components of the telecommunication system. The power measurement device and the additional power measurement device can respectively measure the power of the test signal at different measurement points in the signal path. The controller can normalize signals transmitted via the telecommunication system by adjusting a path gain for the signal path based on measurements from the power measurement device and the additional power measurement device.

WO 97/29608 discloses a method and apparatus for integrating a personal communication system with a cable television plant. A set of radio antenna devices (RAD) are connected to the cable plant. The RADs provide frequency conversion and power control of signal received from the cable plant for wireless transmission to the remote units. The RADs also provide power control and frequency conversion of wireless signals received from the remote units for transmission by the RADs onto the cable plant. In addition to the functions of standard base stations and centralized controller, the CATV base station must also compensate for gain variations in the cable plant. The downstream power control is regulated by a RAD reference signal which can be hidden within the CDMA signal for maximum efficiency.

SUMMARY

An object of the present invention is to solve, or at least mitigate, this problem in the art and thus to provide an improved method of routing one or more reference signals through a DAS to an intended wireless communication device.

This object is attained in a first aspect of the invention by a method performed by a digital distributed antenna system (DAS) of routing at least one reference signal received by at least one digital master unit of the DAS to at least one digital remote unit of the DAS. The method comprises measuring strength of a received reference signal, determining required strength that the received reference signal should have upon being transmitted to a wireless communication device located in a coverage area served by the at least one digital remote unit, and adjusting gain of a routing path of the DAS via which the received reference signal is to be routed to an antenna port of the at least one digital remote unit such that the strength of the received reference signal attains the required strength when being transmitted from said at least one digital remote unit.

This object is attained in a second aspect of the invention by a DAS configured to route at least one reference signal received by at least one digital master unit of the DAS to at least one digital remote unit of the DAS. The DAS comprises at least one processing unit configured to cause the DAS to measure strength of a received reference signal, determine required strength that the received reference signal should have upon being transmitted to a wireless communication device located in a coverage area served by the at least one digital remote unit, and adjust gain of a routing path of the DAS via which the received reference signal is to be routed to an antenna port of the at least one digital remote unit such that the strength of the received reference signal attains the required strength when being transmitted from said at least one digital remote unit.

In a DAS installation, a signal from the DAS for a particular coverage area should be selected by a WCD in preference over other signals. In the example of an in-building installation, these other signals might originate from a macro base station located outside of the building or a different sector output from the DAS on another floor in the building.

The operator core network makes decisions about which RBS signal a WCD should use based on measurements made by the WCD of specific reference signals broadcast by the base station. The strength of a reference signal transmitted by an RBS to a DMU and on to a DRU serving a particular coverage area must be high enough so that the reference signal level from the DAS is significantly higher than alternative reference signals of neighboring cells. This is referred to as signal dominance Advantageously, with the present invention, this is attained by the DAS by measuring strength of a received reference signal, e.g., in the form of an actual power level $L_A$ of the received reference signal intended for a particular WCD via a DRU of the DAS.

Further, a required strength that the received reference signal should have upon being transmitted to the WCD located in the coverage area served by the DRU is determined.

This required level has typically already been determined by a system installer when configuring the DAS and is stored in a database accessible to the DAS units (for example, within one or more of the DMUs and DRUs, or in a separate control unit). Hence, a required power level $L_R$ that the received reference signal should reach is determined.

Thereafter, the DAS adjusts gain of a routing path via which received signals are to be routed to the DRU antenna port such that the actual power level $L_A$ has reached the required power level $L_R$ when the reference signal is transmitted from the DRU into the coverage area serving the WCD Advantageously, with the described embodiment, the DAS has produced an output signal having a power level which enables signal dominance for the DRU.

In an embodiment, the DAS further identifies the type of communication system that the received reference signal is transmitted from; wherein the determining of the required strength that the received reference signal should have is determined as stipulated by the identified type of communication system. Advantageously, this enables the DAS of the invention to be connected to any type of radio communication system with only a minor configuration effort by a system installer.

In a further embodiment, the DAS further monitors the strength of the received reference signal and adjusts the gain of the routing path further if the monitored reference signal indicates that the strength of the received reference signal has changed. Advantageously, by having the DAS closely track the reference signal being input to the DAS, and rapidly adjust to any change in signal level, signal dominance is maintained. Further advantageous is that since the DAS acts quickly, there is no risk that a temporary loss of signal dominance is caused.

In a still further embodiment, the DAS alerts a DAS supervisor if the measured strength of the received reference signal is outside a pre-configured range, for example such that the required strength cannot be reached via any DAS routing path. Hence, any system failure such as for instance broken cabling preventing signals from reaching the DAS can advantageously be swiftly detected and reported.

Further embodiments of the invention will be set forth in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 illustrates a typical digital DAS which previously has been described in the background art section.

Figure 2:
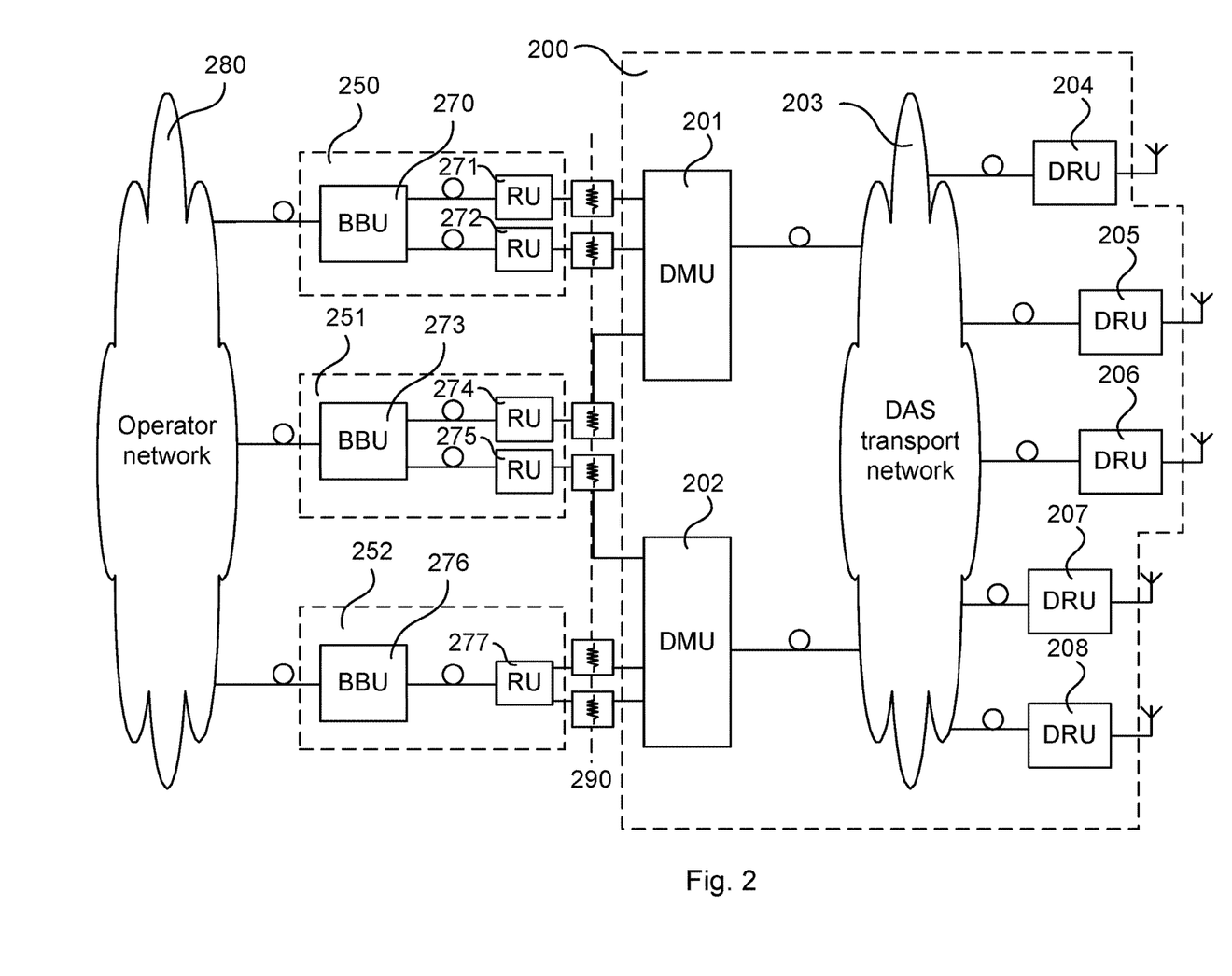
FIG. 2 shows an example of a DAS according to the invention connecting to radio base stations.

FIG. 2 shows an example of how RBSs 250, 251, 252 can be connected to a DAS 200 in an embodiment of the invention. If the RBS-DAS interface uses analogue RF signals, as illustrated in FIG. 2, carrier signals are received from the RBS radio units (RU). The base station vendors have a great deal of freedom in how the transmission of carriers is implemented. The RBSs 251-252 are connected to a core network 280.

For instance, as for first RBS 250, the carriers may be generated from a single baseband unit (BBU) 270 which transmits the different carriers on several different RUs 271, 272 connected to that BBU, and on to a first DMU 201 of the DAS 200 which routes the carriers over a DAS transport network 203 and on to one or more DRUs, in this particular exemplifying embodiment illustrated by means of five DRUs 204-208 each serving one or more wireless communication devices (WCDs) located in a coverage area as provided by the respective DRU, such as a mobile phone, a smart watch, a tablet, a portable WiFi router for a car, etc.

Further, as for second RBS 251, a single BBU 273 may generate carriers which are transmitted via different RUs 274, 275 to a plurality of DMUs 201, 202 of the DAS 200 for further routing to one or more of the DRUs 204-208

Alternatively, as for third RBS 252, a single RU 277 might transmit several carriers from one BBU 276 to the DAS 200. It is also possible that several BBUs are connected through the operator's core network 280 and coordinate with one another such that one BBU transmits one set of carriers and the other BBU transmits another set of carriers.

The DAS 200 converts the radio signals received over the air interface 290 into digital signals, and then filters out the different carriers in the downlink direction to generate separate digital data streams for each carrier which are then converted back into RF signals at the DRUs 204-208 for transmission via DAS antennas connected to the DRUs.

In this particular example, an analog RBS-DAS interface is illustrated. It is noted that the present invention is equally applicable when the RBS-DAS interface is digital.

Figure 3:
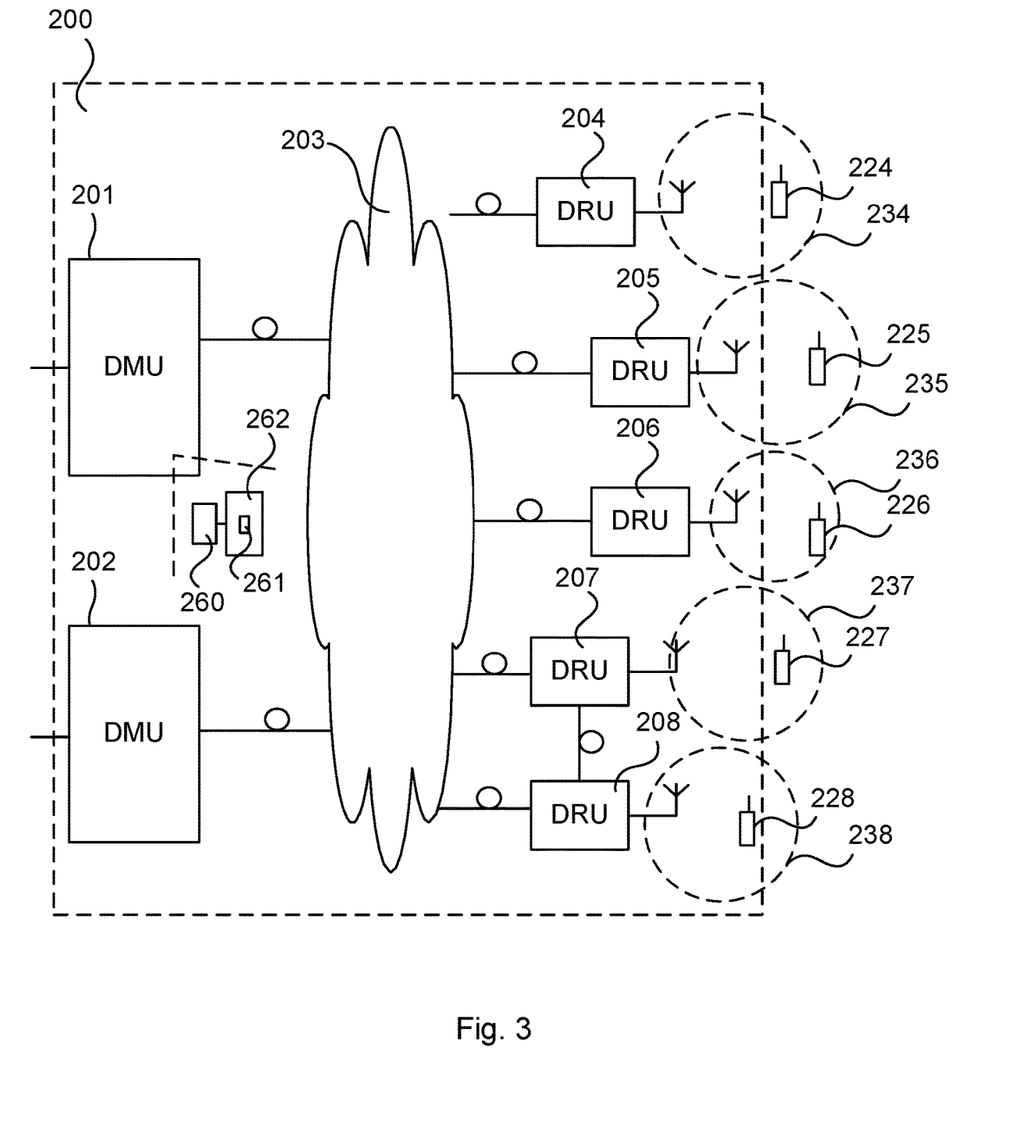
FIG. 3 illustrates the DAS of the present invention, where each DRU provides a coverage area for serving at least one WCD, respectively.

FIG. 3 illustrates the DAS 200 of the present invention, where each DRU 204-208 provides a coverage area 224-228 for serving at least one WCD 234-238, respectively.

One of the aims of a DAS installation is that the signal from the DAS for a particular coverage area should be selected by a WCD in preference over other signals. In the example of an in-building installation, these other signals might originate from a macro base station located outside of the building or a different sector output from the DAS on another floor in the building.

For instance, as long as first WCD 224 is located in first coverage area 234 provided by first DRU 204, the first WCD 224 should select the signals transmitted by the first DRU 204. If and when the first DRU 224 crosses into second coverage area 235, the first WCD 224 should preferably select signals transmitted by second DRU 205.

The operator core network makes decisions about which RBS signal a WCD should use based on measurements made by the WCD of specific reference signals broadcast by the base station. For example, in an LTE system, specific orthogonal frequency division multiplexing (OFDM) carriers and timeslots are reserved for cell-specific reference signals (C-RS) to give a measure known as reference signal received power (RSRP). In a wide band code division multiple access (WCDMA) system, a specific spreading code defines the common pilot channel (CPICH) which serves a similar purpose. In GSM, the RBS received signal strength indicator (RSSI) is based on measurements of the frequency control channel (FCCH) which is multiplexed on the broadcast channel (BCH) from the RBS.

The strength of a reference signal transmitted by an RBS to a DMU and on to a DRU serving a particular coverage area must be high enough so that the reference signal level from the DAS is significantly higher than alternative reference signals of neighboring cells. This is referred to as signal dominance.

Figure 4:
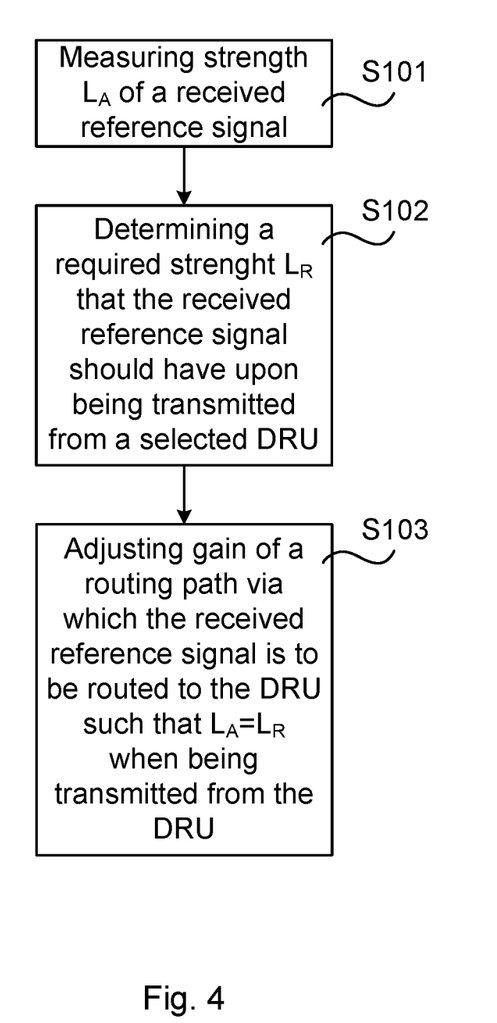
FIG. 4 shows a flowchart illustrating a method of routing reference signals in a DAS according to an embodiment, for attaining signal dominance.

FIG. 4 shows a flowchart illustrating a method of routing reference signals in a DAS according to an embodiment, for attaining signal dominance.

Hence, upon receiving a reference signal from an RBS, the DAS 200 determines in step S101 strength of the received reference signal, by means of additional signal processing operable according to the type of modulated waveform being transferred by the DAS. Hence, the first DMU 201 receives the reference signal and measures, e.g., an actual power level $L_A$ of the received reference signal intended for the first WCD 224 served by the first DRU 204.

Further, in step S102, a required strength that the received reference signal should have upon being transmitted to the first WCD 224 located in the first coverage area 234 served by the first DRU 204 is determined. This required level has typically already been determined when configuring the DAS 200 and is stored in a DAS database accessible by the DMUs 201, 202. Hence, a required power level $L_R$ that the received reference signal should reach is determined.

The required reference signal level $L_R$ at the output of a DRU is mainly defined by two parameters:
  The signal strength at the edge of the coverage area of other potential signal sources over which the DAS signal should be dominant.
  The path loss from the DRU to a WCD at the edge of the coverage area, which depends on the size of the area to be covered and the losses through the antenna system connected to that specific DRU.

The first parameter is measured by walk tests during system installation with special WCDs designed to log the signal levels. The second parameter can for example be measured by generating pilot tones at a known level at the output of a DRU (the DRUs are typically factory-calibrated so that the output power for a certain digital signal level is precisely known).

Thus, upon determining the required strength $L_R$ of the reference signal in step S102, the DAS 200 could in an embodiment acquire the required strength $L_R$ by e.g. looking up a pre-configured value set by the system installer from a database accessible by the DAS 200.

It is non-trivial in current DAS systems to convert the required signal level into a downlink gain setting. The RBS is typically connected via high-power attenuators and coaxial RF cables, which cause an unknown loss over the RBS-DAS interface. The signal coming from the RBS consists not only of the reference signals but also other transmissions. Modern digital DMUs are able to accurately measure the input power level, but cannot distinguish the specific reference signal of interest from other traffic signals (which will also vary depending on the number of WCDs connected to the RBS), since they serve only as a "pipe" for forwarding the received signals with no awareness of the details of the modulated waveforms being transmitted.

Now, in step S103, the DAS 200 adjusts gain of a routing path of the DAS 200 via which the received signals are to be routed to the first DRU 204 such that the actual power level $L_A$ has reached the required power level $L_R$ when the reference signal is being transmitted from the first DRU 204 into the coverage area 224 serving the first WCD 224.

Advantageously, with the described embodiment, the DAS 200 has produced an output signal having a power level which enables signal dominance for the first DRU 204.

Again with reference to FIG. 3, illustrating the DAS 200 in an embodiment of the invention, the steps of the method performed by the DAS 200 are in practice performed by a processing unit 260 embodied in the form of one or more microprocessors arranged to execute a computer program 261 downloaded to a storage medium 262 associated with the microprocessor, such as a Random Access Memory (RAM), a Flash memory or a hard disk drive. The processing unit 260 is arranged to cause the DAS 200 to carry out the method according to embodiments when the appropriate computer program 261 comprising computer-executable instructions is downloaded to the storage medium 262 and executed by the processing unit 260. The storage medium 262 may also be a computer program product comprising the computer program 261. Alternatively, the computer program 261 may be transferred to the storage medium 262 by means of a suitable computer program product, such as a Digital Versatile Disc (DVD) or a memory stick. As a further alternative, the computer program 261 may be downloaded to the storage medium 262 over a network. The processing unit 26o may alternatively be embodied in the form of a digital signal processor (DSP), an application specific integrated circuit (ASIC), a field-programmable gate array (FPGA), a complex programmable logic device (CPLD), etc.

Typically, each of the DMUs 201, 202, and the DAS transport network 203 as well as the DRUs 204-208 comprise these or similar components in order to perform appropriate operations.

Now, in the invention, these processing units 260 are advantageously configured to support the required standards of the communication systems that the DAS 200 is connected to in order to be capable of identifying the received reference signals of the respective standard, and accordingly to determine which required signal level $L_R$ a reference signal should have at an antenna port of a DRU upon being transmitted to and intended WCD.

Figure 5:
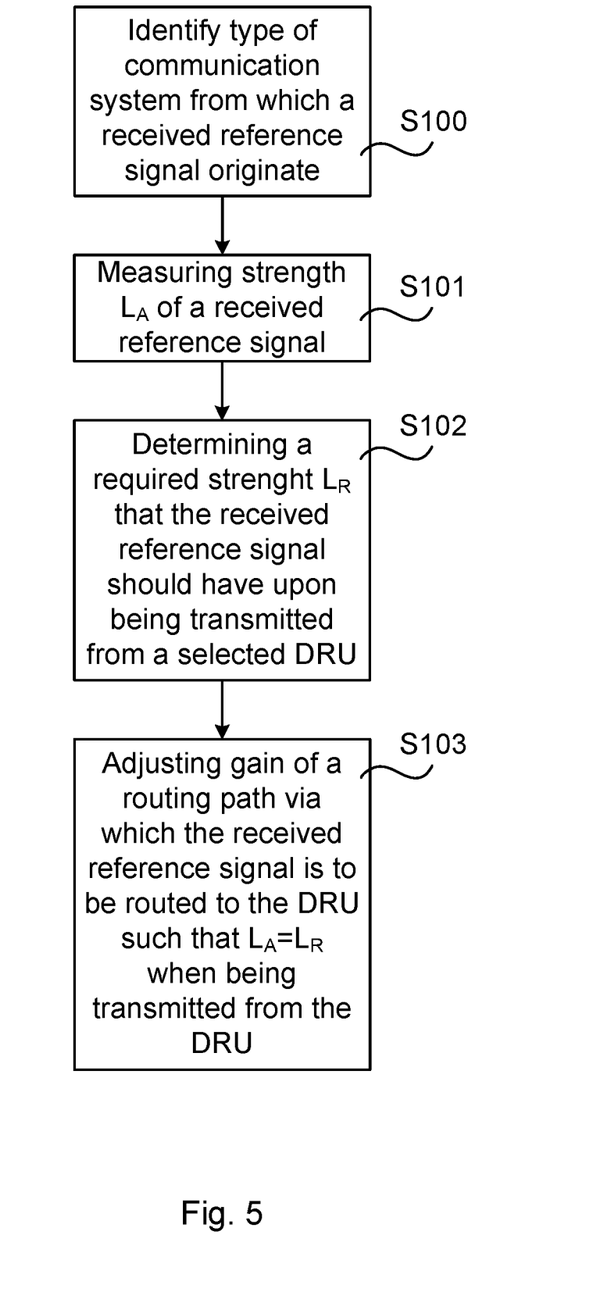
FIG. 5 shows a flowchart illustrating a method of routing reference signals in a DAS according to yet an embodiment.

FIG. 5 shows a flowchart illustrating a method of routing reference signals in a DAS according to yet an embodiment, for attaining signal dominance.

In this particular embodiment, before or after determining the strength of the received signals in step S101 (in this exemplifying embodiment; before), the DAS 200 identifies in step S100 the type of communication system that the received signals are transmitted from.

Hence, the signals received from the RBSs are analyzed by the DAS 200, which identifies whether the signals originate from for instance a GSM, LTE, WCDMA or a Universal Mobile Telecommunications System (UMTS) system.

Depending on the type of identified network system, the required strength of the signals will be set. In other words, the determining of required strength that the received signals should have is determined as stipulated by the identified type of communication system.

As previously mentioned, in for example an LTE system, specific OFDM carriers and timeslots are reserved for cell-specific reference signals C-RS to give a measure known as reference signal received power (RSRP).

The DAS 200 would thus identify in step S100 that the communication system from which the reference signal originates is an LTE system, for example through pre-configuration at the time when the DAS is configured to route a specific carrier, wherein the DAS 200 extracts the C-RS from the received LTE transmission (comprising control data as well as payload data), and determines in step S102 the required reference signal level $L_R$ by fetching a pre-stored value of $L_R$ associated with the particular transmission and destination DRU set by the system installer upon setup of the DAS 200.

Before or after determining $L_R$, an actual signal level $L_A$ of the C-RS is measured in step S101, and the gain of the selected routing path is adjusted such that $L_A=L_D$ when the reference signal C-RS is transmitted from the first DRU 204 and on to the first WCD 224 located in the coverage area 234 served by the first DRU 204.

Advantageously, the DAS 200 of the invention is in this embodiment augmented so that it is no longer purely a transparent "pipe" in terms of the type of signals that the DAS 200 routes to intended WCDs, but has an awareness of the specific protocols of the signals being transported, the protocols being configured according to requirements of the type of communication system from which the signals originate.

In this way, as previously was described with reference to FIG. 3, the DAS 200 implements—with the processing unit(s) 260—the physical layer signal processing needed to measure and determine the reference signal level $L_A$. This signal processing can be optimized for a DAS thanks to the absence of real-time requirements; off-line processing may be performed with a single processing unit 260 sequentially performing measurements over a number of base station inputs in turn.

Figure 6:
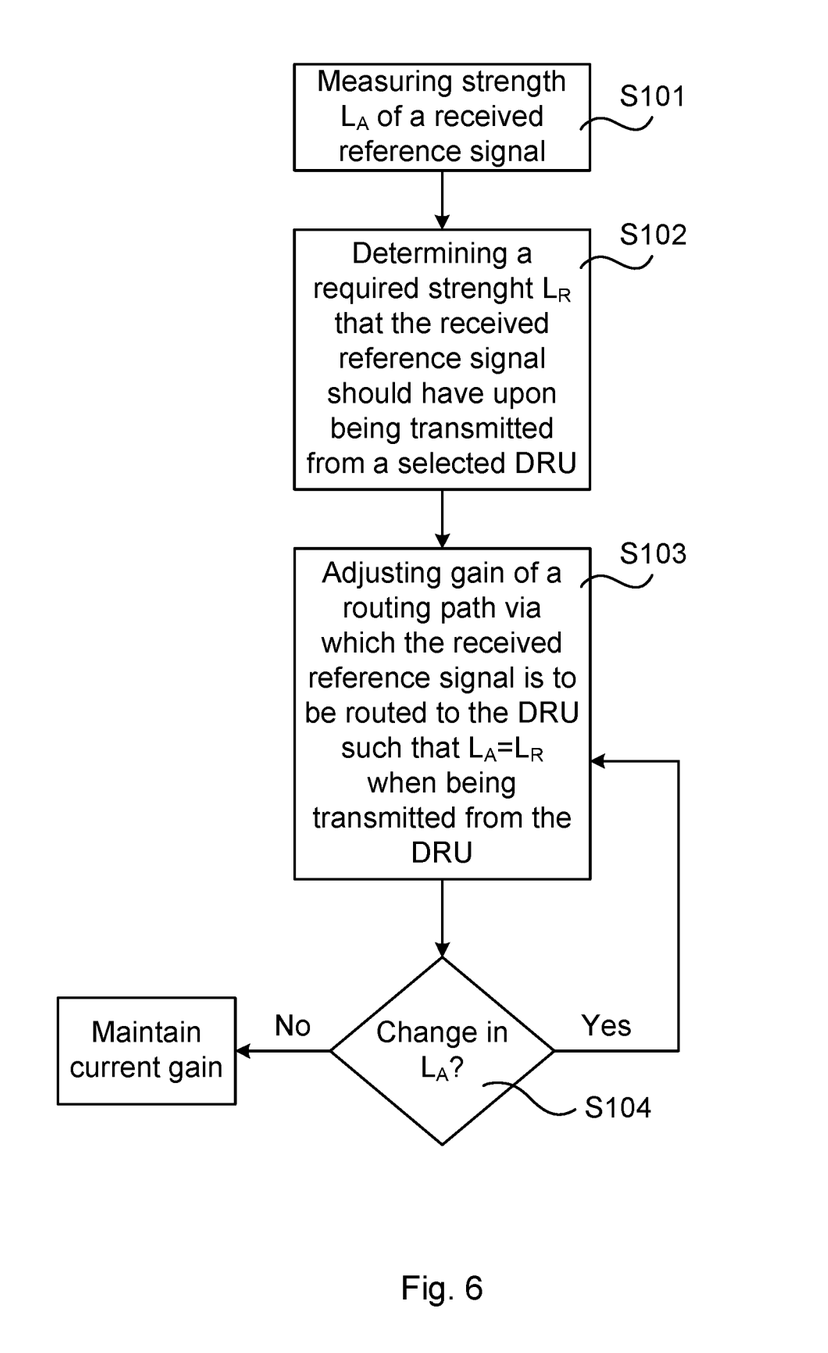
FIG. 6 shows a flowchart illustrating a method of routing signals in a DAS according to still an embodiment.

FIG. 6 shows a flowchart illustrating a method of routing signals in a DAS according to still an embodiment.

Now, the DAS 200 monitors in step S104 the strength of the received reference signal, which is continuously submitted by the RBS to the DAS 200, and if the DAS 200 detects that the actual power level $L_A$ changes, the DAS 200 returns to step S103 and adjusts the gain of the routing path further to meet the change in $L_A$ in order to ensure that the power level of the reference signal is at the required level $L_R$, i.e. $L_A=L_R$. If there is no change in actual signal level $L_A$, the current routing path gain is maintained.

In a still further embodiment, if the measured strength $L_A$ of the received reference signal is outside a pre-defined range, for example such that the required strength $L_R$ cannot be reached via any DAS routing path, the DAS alerts a DAS supervisor. This is advantageous since it indicates to a supervisor a system failure, such as for instance broken cabling preventing signals from reaching the DAS 200.

Figure 7:
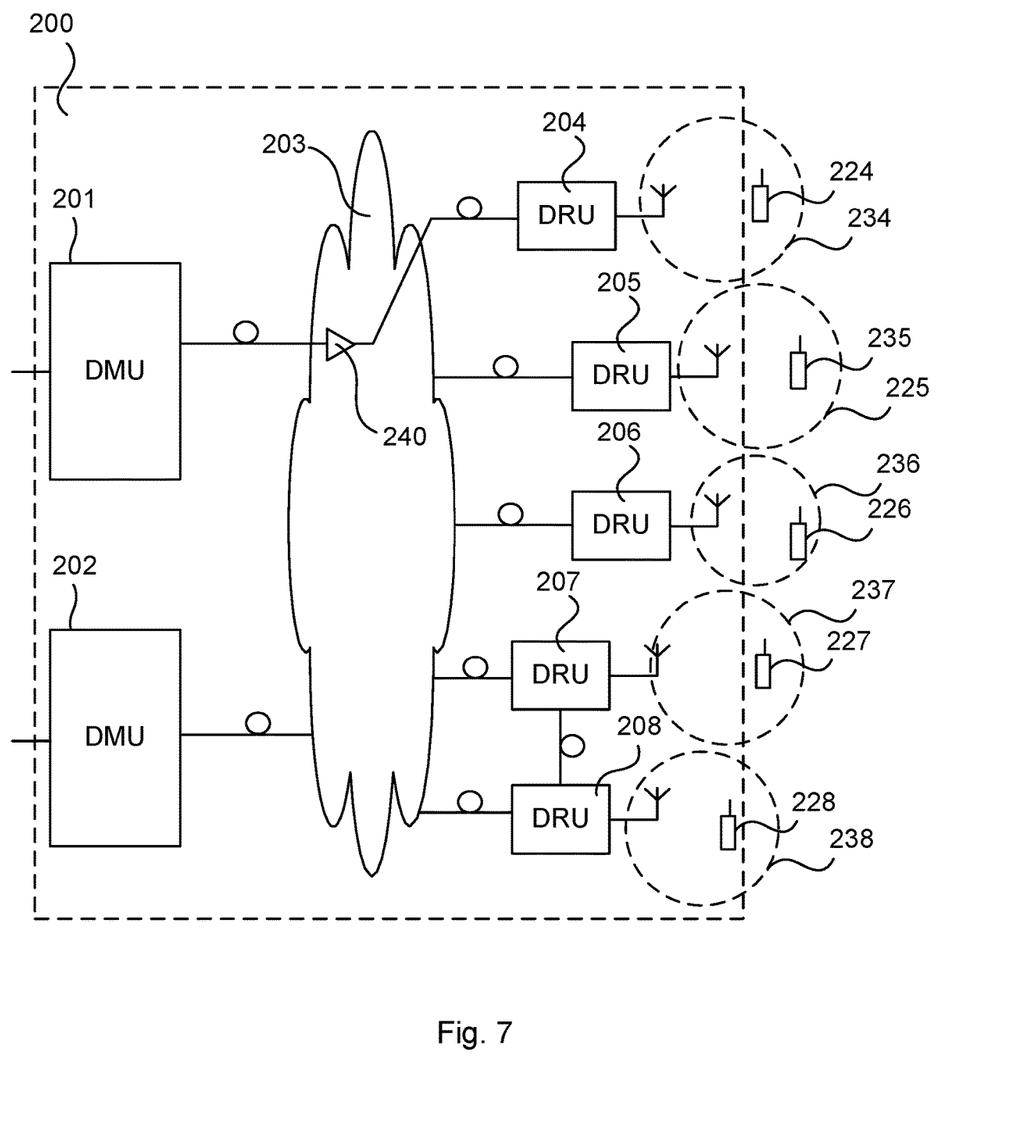
FIG. 7 illustrates the DAS of the present invention in an embodiment where either one or both of an amplifier and a filter is arranged in the routing path for adjusting the gain of the routing path.

FIG. 7 illustrates the DAS 200 of the present invention in an embodiment where an amplifier 240 is arranged in the routing path for adjusting the gain of the routing path in order to provide a reference signal having a required power level $L_R$ at the output of the first DRU 204.

Thus, the gain of the routing path via which the received reference signal is transported from the first DMU 201 to the first DRU 204 may be controlled by a variable-gain amplifier 240. The amplifier 240 may be of analog or digital type. It is further noted that while the amplifier 240 in FIG. 7 is illustrated to be located in the DAS transport network 203, such as e.g. in a routing unit of the DAS; the amplifier 240 may be located anywhere in the routing path, for instance in the DMU 201 or in the DRU 204. It is further noted that the amplifier 240 may be embodied by a distributed gain stage comprising a number of separate components physically located at different sections of the routing path.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a digital Distributed Antenna System ("DAS") of routing at least one reference signal received by at least one digital master unit of the DAS to at least one digital remote unit of the DAS, the method comprising:
- identifying a type of communication system that the received reference signal is transmitted from;
- measuring a strength of a received reference signal;
- determining a required strength that the received reference signal should have upon being transmitted to a wireless communication device located in a coverage area served by the at least one digital remote unit, wherein the determining of the required strength that the received reference signal should have is determined as stipulated by the identified type of communication system; and
- adjusting a gain of a routing path of the DAS via which the received reference signal is to be routed to an antenna port of the at least one digital remote unit such that the strength of the received reference signal attains the required strength when being transmitted from said at least one digital remote unit.

2. The method of claim 1, further comprising:
- monitoring the strength of the received reference signal; and
- adjusting the gain of the routing path further if the monitored reference signal indicates that the strength of the received reference signal has changed.

3. The method of claim 1, further comprising:
- alerting a DAS supervisor if the measured strength of the received reference signal is outside a pre-defined range.

4. The method of claim 1, wherein the adjusting of the gain of the routing path is performed by:
- adjusting the gain of a variable-gain amplifier arranged in the routing path via which the received reference signal is routed.

5. The method of claim 1, wherein the determining of the required strength of the reference signal is performed by:
- acquiring a pre-configured value of the required strength from a database accessible by the DAS.

6. A digital Distributed Antenna System ("DAS") configured to route at least one reference signal received by at least one digital master unit of the DAS to at least one digital remote unit of the DAS, the DAS comprising at least one processing unit configured to cause the DAS to:
- identify a type of communication system that the received reference signal is transmitted from;
- measure a strength of a received reference signal;
- determine a required strength that the received reference signal should have upon being transmitted to a wireless communication device located in a coverage area served by the at least one digital remote unit, wherein the determining of the required strength that the received reference signal should have is determined as stipulated by the identified type of communication system; and
- adjust a gain of a routing path of the DAS via which the received reference signal is to be routed to an antenna port of the at least one digital remote unit such that the strength of the received reference signal attains the required strength when being transmitted from said at least one digital remote unit.

7. The DAS of claim 6, wherein the processing unit is further configured to cause the DAS to:
- monitor the strength of the received reference signal; and
- adjust the gain of the routing path further if the monitored reference signal indicates that the strength of the received reference signal has changed.

8. The DAS of claim 6, wherein the processing unit is further configured to cause the DAS to:
- alert a DAS supervisor if the measured strength of the received reference signal is outside a pre-defined range.

9. The DAS of claim 6, wherein the processing unit is further configured to cause the DAS to, when adjusting the gain of the routing path:
- adjust the gain of a variable-gain amplifier arranged in the routing path via which the received reference signal is routed.

10. The DAS of claim 6, wherein the processing unit is further configured to cause the DAS to, when determining the required strength of the reference signal:
- acquire a pre-configured value of the required strength from a database accessible by the DAS.

11. A computer program comprising computer-executable instructions stored on a non-transitory computer readable storage medium, the computer-executable instructions being configured to cause a DAS to perform the steps recited in claim 1 when the computer-executable instructions are executed on a processing unit included in the DAS.

* * * * *